Aug. 22, 1933.  G. B. NOLAND  1,923,794
CHRISTMAS TREE STAND
Filed Oct. 4, 1932
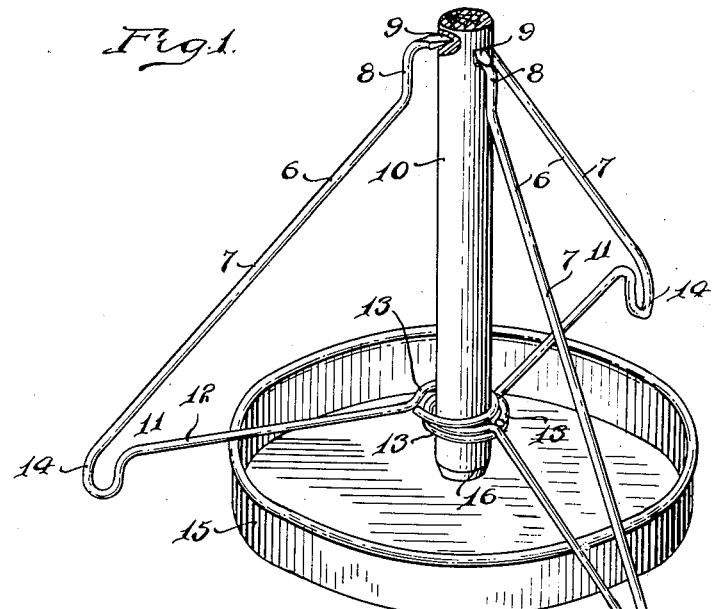
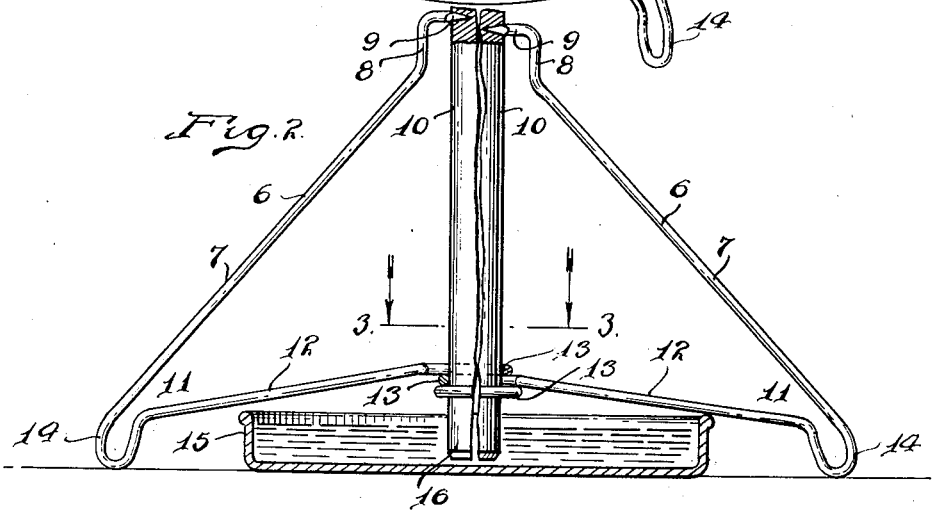
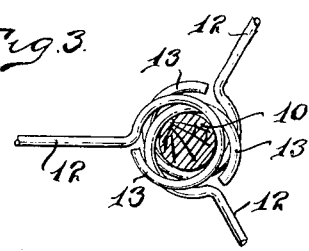
INVENTOR.
GEORGE BERNARD NOLAND
BY Edward M. Apple
ATTORNEY.

Patented Aug. 22, 1933

1,923,794

UNITED STATES PATENT OFFICE 1,923,794

CHRISTMAS TREE STAND

George Bernard Noland, Northville, Mich., assignor of one-half to Warren C. Lichty, Wayne, Mich.

Application October 4, 1932. Serial No. 636,197

8 Claims. (Cl. 248—38)

This invention relates to improvements in Christmas tree stands and has for its principal object the provision of a stand which is simple in construction, economical to manufacture and readily assembled.

Another object of the invention is to provide a stand which will firmly support a Christmas tree without the necessity of resting the base of the tree directly on the floor.

Another object of the invention is to provide a stand which will firmly support a Christmas tree and at the same time allow the base of the tree to be freely submerged in a vessel of water in order to keep the tree fresh.

Another object of the invention is to provide a stand for a Christmas tree, the efficiency of which will increase in proportion to the weight supported by it.

The foregoing objects and other advantages of the invention will be more readily understood from a careful examination of the following specifications and the accompanying drawing, in which:

Fig. 1 is a perspective view of the improved stand showing its application to a tree trunk, the base of which is submerged in a water vessel.

Fig. 2 is an elevational view partly in section with parts broken away, with one section swung out of normal position for illustrative purposes.

Fig. 3 is a top sectional view taken on line 3—3 of Fig. 2.

Referring now to the drawing, the improved stand as shown comprises a multiplicity of separate and detached sections 6, which are identical in size and shape so that a description of one will suffice for all.

Each section 6 is formed of a single length of metal bent into an acute angle 11, one side of which is longer than the other. The longer side comprises a shank 7, which normally rests in a vertical plane and is formed so that the free end terminates in a gooseneck 8 and a sharply pointed head 9, the latter being adapted to be driven into the trunk of the tree 10. The short side of the angle 11 comprises a radial arm 12, the free end of which terminates in an annular member 13, which rests normally in a horizontal plane and which is adapted to encircle the trunk of the tree 10.

A dependent loop or foot 14 of a predetermined height is formed at the apex of the angle 11 between the shank 7 and the radial arm 12 in such manner as to provide sufficient clearance under the radial arm 12 for the provision of a water vessel 15.

To assemble my improved stand, the annular member 13 of each section 6 is slipped over the tree trunk 10 and moved to the desired position. The sections 6 are then swung arcuately, and evenly distributed around the trunk of the tree 10 and then secured by pounding the pointed heads 9 into the trunk of the tree 10. The assembled stand and tree are then placed over a vessel of water in such manner that the base 16 of the tree trunk 10 is submerged. The moisture thus acquired by the tree through this means is sufficient to keep the tree fresh and prevent the needles from falling for a considerable period of time.

It will be noted that in using my improved stand, the tree 10 is actually supported upon the heads 9 while the loose fitting annular members 13 on the radial arms 12 act as balancing means to hold the tree erect. As the full weight of the tree bears upon the heads 9, it will be evenly distributed through the several sections 6 to the floor. The weight of the tree will cause the shanks 7 to flex outwardly, which movement will continue until the inner peripheries of the annular members 13 firmly contact the trunk of the tree 10 from opposing positions, as shown in Fig. 3.

It will also be noted that the efficiency of this stand will increase in proportion to the weight placed thereon for the reason that the increased weight will cause the pointed heads 9 to be urged more deeply into the tree trunk 10, and an increased clutching effect will result between the annular members 13.

While this invention has been described as being applied to a Christmas tree, it is evident that it can be used also with similar objects to hold them erect.

Having thus described my invention, what I claim and desire to secure by Letters Patent, is:

1. As an improved article of manufacture, a section for a tree support comprising a single length of metal having a sharp head at one end and an annulus at its opposite end, and bent to form an acute angle intermediate its ends.

2. As an improved article of manufacture, a section for a tree support comprising a length of metal bent intermediate its ends to form an acute angle with a dependent loop adjacent its apex, one of said ends terminating in a straight hook, the other said end terminating in an annulus.

3. As an improved article of manufacture, a section for a tree support comprising a length of metal bent to form an acute angle and a dependent loop at the apex of said angle, and means on one end thereof adapted to be driven into the trunk of the supported tree, and means at the opposite end thereof adapted to encircle the trunk of the supported tree.

4. A stand comprising a multiplicity of identical sections, each section being formed of a single length of metal bent to an acute angle, one end thereof terminating in a straight hook having a sharp point, the other end thereof terminating in an annular member.

5. In combination with a Christmas tree, a stand comprising a plurality of identical sections, each section being formed of a single length of metal bent to an acute angle, one end thereof terminating in a sharp hook adapted to pierce the trunk of said tree, the other end terminating in an annular member adapted to encircle the trunk of said tree.

6. In combination with a Christmas tree, a stand comprising a plurality of identical sections, each section being formed of a single piece of metal bent intermediate its ends to make a dependent loop, one end of said loop extending upwardly and inwardly and terminating in a sharp member adapted to be driven into the trunk of said tree, the other end of said loop extending inwardly and terminating in an annular member adapted to encircle the trunk of said tree.

7. In combination with a Christmas tree, a stand comprising a plurality of identical sections arranged about the trunk of said tree, each section being formed of a single length of metal bent to form a dependent loop intermediate its ends, said loop being adapted to serve as a foot, a comparatively long shank extending upwardly from one side of said loop to the trunk of said tree, said shank terminating in a sharp spur adapted to penetrate the trunk of said tree, a radial arm extending from said loop toward said tree, said arm terminating in an annular member adapted to encircle the trunk of said tree.

8. In combination with a Christmas tree having its base submerged in a water vessel, a stand comprising a plurality of identical sections arranged about the trunk of said tree and over said water vessel, each section being formed of a single length of metal bent to form an acute angle having a dependent loop near its apex, said loop being adapted to serve as a foot, a shank extending from one side of said loop upwardly to said tree, said shank terminating in a pointed head adapted to pierce the trunk of said tree, an arm extending from the other side of said loop to said tree, said arm terminating in an annular member adapted to encircle the trunk of said tree.

GEORGE BERNARD NOLAND.